United States Patent [19]

Hoffmann et al.

[11] 4,093,869
[45] June 6, 1978

[54] QUADRATURE AXIS FIELD BRUSHLESS EXCITER

[75] Inventors: Arthur H. Hoffmann, Monroeville; Dale I. Gorden, North Versailles; Lee A. Kilgore, Export, all of Pa.

[73] Assignee: Westinghouse Electric Corp., Pittsburgh, Pa.

[21] Appl. No.: 676,449

[22] Filed: Apr. 13, 1976

[51] Int. Cl.² ............................................. F02N 11/04
[52] U.S. Cl. ........................................ 290/31; 290/46; 290/39; 290/49; 290/52
[58] Field of Search ...................... 290/10, 22, 31, 32, 290/39, 46, 49.4, 52

[56] References Cited

U.S. PATENT DOCUMENTS

| | | | |
|---|---|---|---|
| 3,591,844 | 7/1971 | Schonebeck et al. | 290/52 |
| 3,764,815 | 10/1973 | Habock et al. | 290/52 |
| 3,908,130 | 9/1975 | Lafuze | 290/31 |
| 3,908,161 | 9/1975 | Messenger | 290/38 |

Primary Examiner—Robert K. Schaefer
Assistant Examiner—Michael K. Mutter
Attorney, Agent, or Firm—G. H. Telfer

[57] ABSTRACT

Method and apparatus for accelerating a large inertia load from rest to a predetermined speed of rotation by means of a synchronous dynamoelectric machine. A synchronous dynamoelectric machine, such as a turbine generator, which is mechanically coupled to a gas turbine prime mover, is started synchronously to bring the gas turbine up to a speed which exceeds its stall speed under load. The rotor field winding of the synchronous dynamoelectric machine is connected to receive direct current excitation from a rotatable rectifier assembly of a brushless exciter. During starting, a quadrature axis winding disposed around the stator of the brushless exciter is energized by single phase alternating current. Alternating current excitation is induced by transformer action within the rotor armature winding of the exciter and is applied to the rotor field winding after being rectified by the rotatable rectifier assembly. The transformer action operates independently of the rotation of the rotor member of the synchronous dynamoelectric machine so that the brushless exciter develops direct current field excitation for starting purposes when the rotor is at rest. Polyphase alternating current excitation is applied to the synchronous dynamoelectric machine stator winding to establish a dynamic magnetic field which rotates at a speed proportional to the frequency of the applied excitation. Interaction of the static magnetic field of the rotor and the rotating stator field produces the mechanical turning force. The frequency of the synchronously applied stator excitation is increased from substantially zero cycles per second to a higher frequency until the rotor member has accelerated synchronously to the desired speed of rotation.

10 Claims, 4 Drawing Figures

QUADRATURE AXIS FIELD BRUSHLESS EXCITER

BACKGROUND OF THE INVENTION

1. Field of the Invention

The present invention relates to excitation systems for synchronous dynamoelectric machines, and more particularly to a method and means for starting a synchronous dynamoelectric machine which is mechanically coupled to a large inertia load.

2. Description of the Prior Art

Certain prime movers, for example gas turbines which are designed to drive large generators, are not selfstarting and must be accelerated to nearly 60% of full speed whereupon the combustor can be ignited and the developed turbine power is sufficient to continue acceleration to full speed. Typically, a gas turbine is started by a clutch-connected device, usually an induction motor, starting turbine, or diesel engine. Each of these are geared through a speed increaser and a torque converter. When an induction motor starter is used, the required size of this motor is about 6% of the turbine generator rating. For example, for a turbine generator rating in the 70 to 80 megawatt range the power rating of the starting motor is approximately 1500 horsepower. Current in-rush of such a motor is usually about six times the rated motor KVA, and such large KVA demand is not always available from the system that the oncoming generator is being connected to.

Also, in a plant including several gas turbine generators, each turbine generator requires its own starting motor which remains idle except for use during a brief starting period. In addition suitable control equipment must be provided for the motors, and torque converters with the necessary cooling system, speed increasing gears, and clutches are also required for the complete starting system. Because of the expense associated with providing and maintaining a separate starting motor for each turbine generator, there is substantial interest in providing an alternative starting arrangement which can serve multiple generator prime mover units.

It has been proposed to start prime movers which are not self-starting by using the generator itself as a starting motor, as in the patents to Erikson, U.S. Pat. No. 3,132,297; and Schonebeck et al., U.S. Pat. No. 3,591,844. This has been done with relative success with small machines, such as aircraft generators driven by internal combustion engines, but the method and structure as suggested in those references is neither practical nor desirable in the case of large synchronous generators such as are used in plants supplying power to utility systems. A suitable starting arrangement in which the exciter for a synchronous generator is used to start a large prime mover such as a gas turbine is disclosed in Kilgore et al. U.S. Pat. No. 3,809,914. However, this arrangement relies upon a combination of switches and slip rings to cause the exciter alternator to operate as a variable speed, wound rotor induction motor for starting purposes. Such an arrangement cannot be effectively utilized for starting a synchronous dynamoelectric machine of the type having a brushless exciter since no slip rings or other sliding electrical contacts are employed.

SUMMARY OF THE INVENTION

In accordance with the present invention, electrical means are provided for accelerating the rotor member of a synchronous dynamoelectric machine which is mechanically connected to a high inertia load, without utilizing auxiliary starting devices such as induction motors and diesel engines. While the invention has particular utility in starting a prime mover such as a gas turbine which is inherently not self-starting, it has general utility for accelerating the rotor of any synchronous dynamoelectric machine which is connected to a large inertia load. This system is of course not limited to starting external loads but may be used to start any synchronous dynamoelectric machine which requires separate starting means, such as large synchronous condensers.

In the present invention, a synchronous dynamoelectric machine (a turbine generator) has its rotor member mechanically coupled to a large inertia load (a gas turbine prime mover). The synchronous generator-gas turbine prime mover combination is started by connecting the synchronous generator stator winding to a low frequency alternating current power supply. The alternating current power supply is gradually increased in frequency until the rotor member of the synchronous generator has accelerated to a speed at which the turbine prime mover power exceeds the starting resistance torque, whereupon the input current to the generator stator winding is removed.

Starting a synchronous generator by the synchronous method described above requires that direct current be applied to the field winding at all times during the starting period when low frequency current is applied to the stator windng. On those generators which are provided with collector rings this presents no problem. On those turbine generators which are excited by brushless exciters, however, the direct current excitation is provided by a brushless alternator which includes a rotating armature winding and a rotating rectifier assembly. In this type of alternator, the direct current output of the rotating rectifier is generally proportional to the speed of rotation of the rotor shaft. Therefore when the rotor shaft is at rest the direct current output of the rectifier assembly is zero. No mechanical turning force is developed since there is no rotor magnetic field to ineract with the stator magnetic field.

In the present invention, direct current field excitation is provided for the synchronous generator field winding in a manner which operates independently of the speed of the rotor shaft so that the exciter armature will have sufficient excitation output capability for starting purposes with the shaft at zero or very low speeds, the output being derived by the transformer induction principle. To accomplish this object, an alternating current field winding is interposed between the existing salient pole direct current stator field coils of the brushless exciter alternator. The existing salient pole stator field winding cannot be used for this purpose because its inductive reactance at usual operating frequencies would require a very high voltage to be applied. If the DC field winding were designed for low applied voltage at 60 Hz, the direct current required at normal exciter operation would be prohibitively high, because of the relatively small number of turns comprising the conventional DC winding.

The AC field winding of the present invention is arranged in space-quadrature relation with the DC field winding, the DC field winding being disposed concentrically about each salient pole with its axis in line with the direct axis of the flux which passes through the salient pole member. By this arrangement, the 60 Hz field which is created when the alternating current space-quadrature winding is excited will not induce voltages into the direct current field winding, which is inactive during the starting period. Such induced voltages might cause damage to insulation or other components associated with the brushless DC excitation circuit.

It is preferred that the alternating current quadrature field winding be excited by single phase alternating current of a convenient line frequency. The single phase alternating current flux produced in the armature winding of the main brushless exciter will develop unbalanced voltages in the three phase armature winding of the rotor. However, in the short period of time required to accelerate the typical synchronous generator-gas turbine combination (about 5 minutes), alternating current can be applied to this winding to develop sufficient air gap flux so that adequate direct current excitation output will be delivered to the generator field winding (which is generally 20% of the load current) for the synchronous starting procedure without risk of damage to the brushless exciter aramature or associated components.

BRIEF DESCRIPTION OF THE DRAWINGS

While the specification concludes with claims particularly pointing out and distinctly claiming that which is regarded as the present invention, the organization, the advantages, and further objects of the invention may be readily ascertained from the following detailed description when read in conjunction with the accompanying drawing in which:

DESCRIPTION OF THE PREFERRED EMBODIMENT

Figure 1:
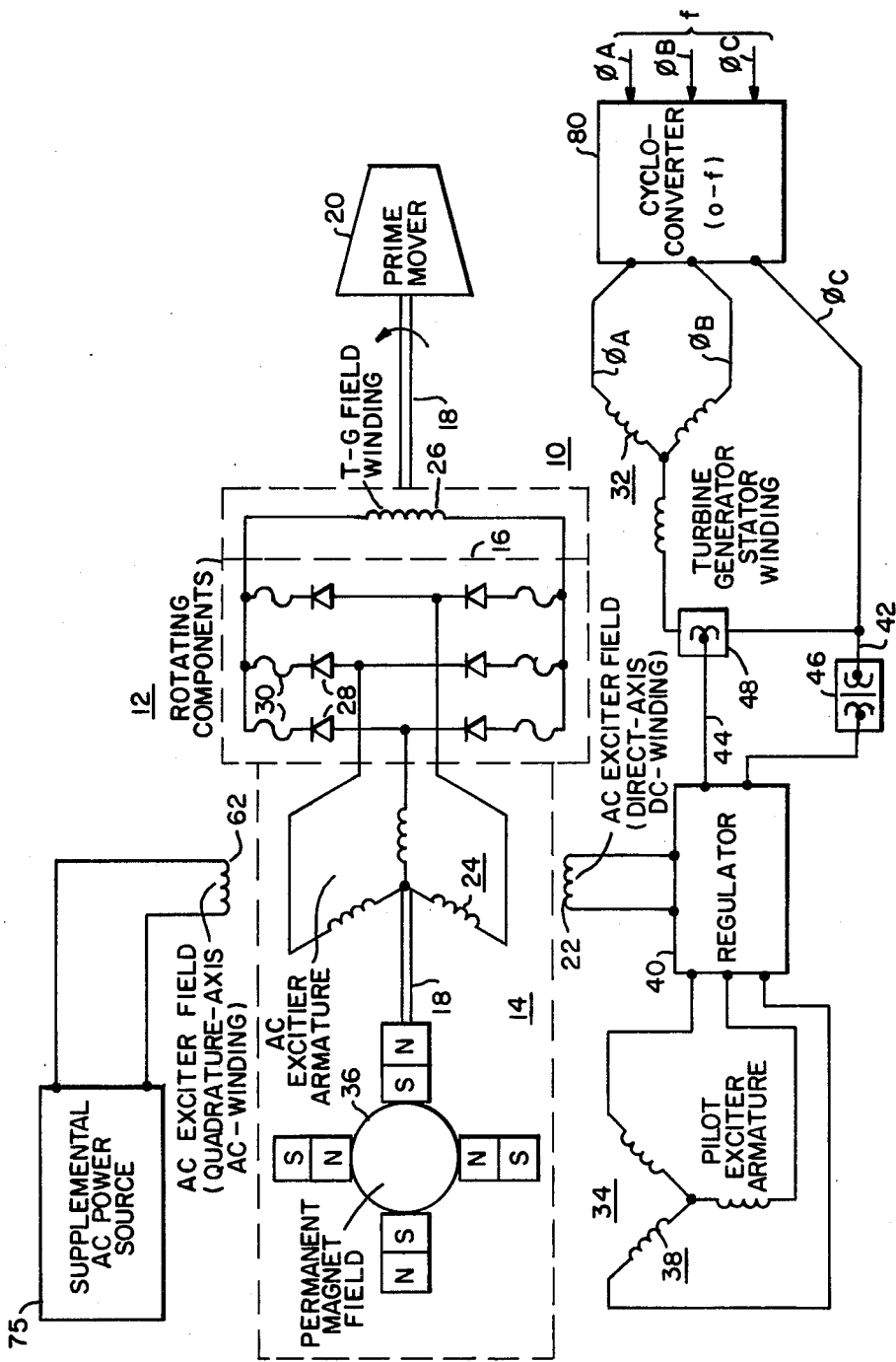
FIG. 1 is a schematic diagram showing a preferred embodiment of the invention.

A preferred embodiment of the present invention is shown in FIG. 1 for starting a large synchronous dynamoelectric machine 10, for example, a large synchronous generator. The synchronous dynamoelectric machine 10 is excited by a brushless excitation system 12 having an alternating current exciter 14 and a rotating rectifier assembly 16 mounted on a common shaft 18 which is connected with a large inertia load, for example, a gas turbine prime mover 20. The alternating current exciter 14 may be of any suitable type having a stationary stator field member 22 and a rotating armature member, the armature member comprising a three phase winding 24 disposed in radial slots within a core 25 carried on the shaft 18 so as to be rotatable with a main rotor field winding 26 of the synchronous dynamoelectric machine 10. The armature winding 24 is connected to the rotating rectifier assembly 16 which includes a plurality of rectifiers 28 and fuses 30 connected in a conventional bridge arrangement to provide direct current output for excitation of the field winding 26. The direct current excitation flowing through the rotor field winding 26 establishes a magnetic field which induces current flow within a stator armature winding 32 of the synchronous generator 10 when the rotating components of the brushless excitation system are caused to rotate by the prime mover 20.

The main exciter 14 receives its field excitation from a pilot exciter 34 which includes a permanent magnetic field member 36 mechanically connected to the shaft 18 for rotation by the prime mover 20. As the shaft 18 rotates, the permanent magnet field is rotated within an annular armature winding member 38 in which alternating current is induced by magnetic induction in the usual manner. The output of the pilot exciter armature winding 38 is electrically connected to a regulator 40 which is operable to convert the polyphase alternating current excitation from the pilot exciter armature to direct current excitation which is applied to the AC exciter field winding 22. The output of the regulator is responsive to a current signal 42 and a voltage signal 44 which is derived by means of a current transformer 46 and voltage transformer 48, respectively, both being connected to one branch of the stator armature winding 32. The direct current output excitation of the regulator 40 is generally proportional to a predetermined function of the level of the power output of the turbine generator 32 for regulation purposes.

Figure 2:
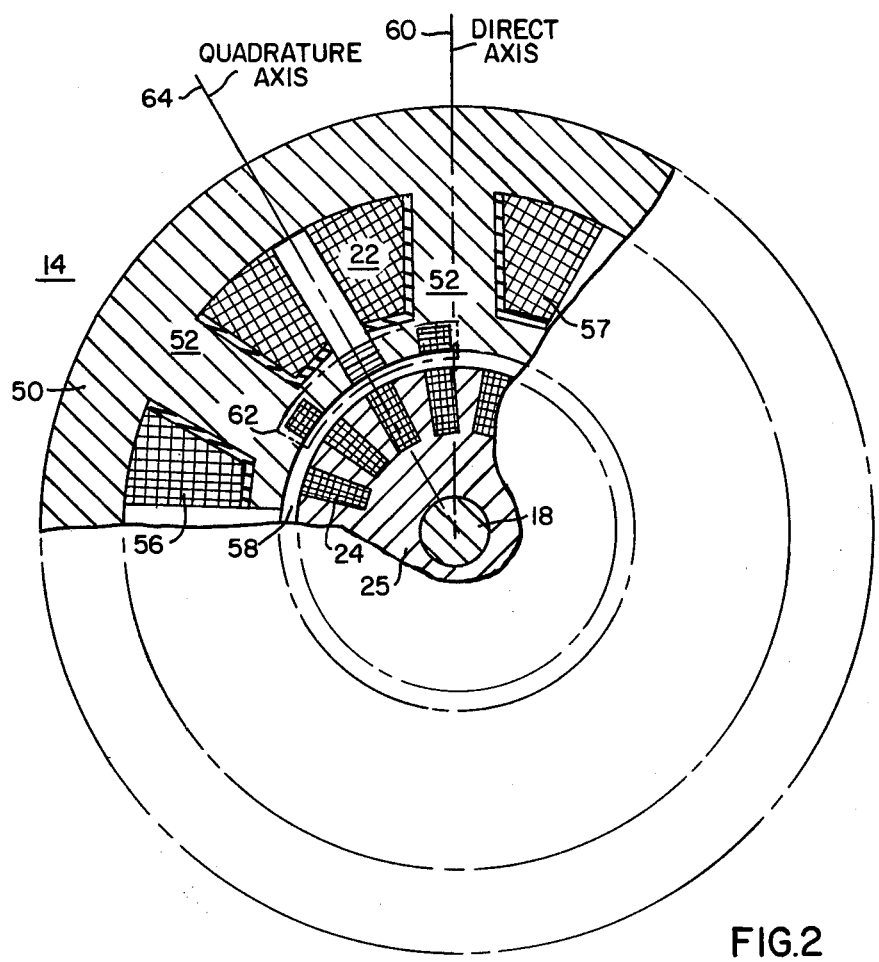
FIG. 2 is a partial sectional view of the alternator of a brushless exciter which includes a quadrature axis AC winding constructed according to the teachings of the present invention.

Referring now to FIG. 2, the alternating current exciter 14 includes a stationary stator core structure 50 having a plurality of salient pole portions 52 which are concentrically disposed and spaced apart from the armature member. A field winding 56 encircles each of the salient pole members 52, preferably in a plane which is parallel to the axis of the armature member. The field winding 56 comprises a plurality of field coils 57 which are series connected to constitute the field winding. When the coils 57 are energized by direct current from the regulator 40, the salient pole portions 52 are magnetized to establish a plurality of magnetic poles of alternating polarity. Alternating current is induced within the polyphase armature winding 24 as the shaft 18 causes the armature member to rotate within the annular stator member 14. Lines of flux pass through the air gap 58 between the exciter stator core 50 and the armature core 25 and pass through the salient pole portions 52 substantially along the direct axis of the salient pole portion 52 as indicated by the dashed line 60.

Figure 3:
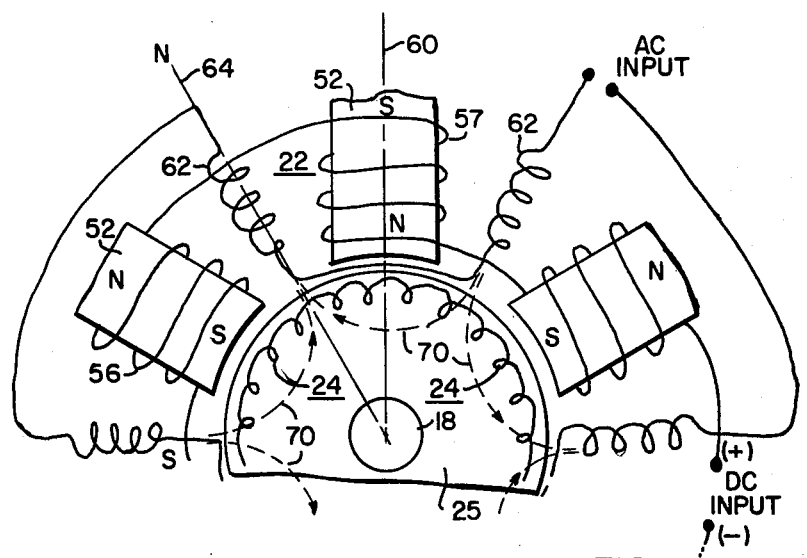
FIG. 3 is a partial electrical schematic diagram of the stator windings of the alternator of FIG. 3; and, FIG. 4 is a block diagram which illustrates the application of the present invention in a power generating plant which includes a plurality of gas turbine generators.

An alternating current induction starting coil 62 is interposed between adjacent ones of the salient poles, with its magnetic axis being disposed substantially in space-quadrature relation with respect to the direct axis 60, or magnetic axis, of the direct current field coil 57. The quadrature axis of the alternating current starting winding 62 is indicated by the dashed line 64. The starting coil 62 comprises a plurality of turns which are embedded in slots located near the center portion of each salient pole face and is extended through the space which lies between adjacent salient pole portions and the associated field coil portions 57. The magnetic axis of the AC starting coil 62 is arranged in space-quadrature relation with respect to the magnetic axis of the direct current field coil 57 so that the alternating current field which is created when the AC starting winding is energized will not induce voltage into the DC field winding 56 which is inactive during the starting period. Such voltages might cause damage to the insulation on the direct current field winding or to other components such as diodes or SCR's in the DC excitation circuit. Since the DC field winding 56 is not energized during starting, the salient pole portions are not magnetized and magnetic flux lines 70 as represented by the dotted lines in FIG. 3 will be established between the magnetic poles established by the starting winding 62 for a given point in time.

A voltage is induced within the armature winding 24 by means of the transformer induction principle so that rotation of the shaft 18 is not required to produce direct current excitation for the turbine generator field winding 26. The alternating current supplied to the starting winding 62 may be of any convenient line frequency, for example 60 Hz, and should be of sufficient magnitude to supply adequate direct current excitation to the turbine generator field winding 26. The single phase AC flux will develop unbalanced voltages in the three phase armature winding 24 of the exciter rotor member. However, because of the short period of time typically required to accelerate a prime mover such as a gas turbine, this unbalanced current condition is not harmful in most machines.

In bringing the shaft 18 of the prime mover up to a speed sufficient to enable the power of the prime mover to complete the acceleration to operating speed, the turbine generator field winding 26 is energized by direct current which flows from the rotating rectifier assembly 16 in response to alternating current which is induced within the exciter armature winding 24 in response to the single phase alternating current excitation which is applied to the quadrature axis alternating current field winding 62 which is interposed in space quadrature relation with adjacent direct current field windings 56 between adjacent salient pole portions 52 of the stator core 50 in the exciter 14. Once the static magnetic field is established by the flow of direct current through the synchronous generator field winding 26, the generator 10 is started synchronously by applying polyphase alternating current to the stator winding 32 to establish a dynamic magnetic field which rotates at a speed proportional to the frequency of the applied excitation. The frequency of the applied excitation is increased from substantially zero cycles per second to a higher frequency until the shaft 18 has been accelerated to a predetermined speed of rotation. The amplitude of the applied excitation is also increased in proportion to frequency. The variable frequency polyphase excitation is provided in the present arrangement by means of a cycloconverter 80 which receives as its input polyphase alternating current, for example, phase A, phase B, and phase C, the phases being displaced in time by 120°, and has as its output a polyphase excitation signal whose phases are also displaced by 120° but whose amplitude is adjustable and whose frequency is variable from substantially zero cycles per second upward to the line frequency of the incoming polyphase signals. Specific cycloconverter circuits for performing this function are well known and may be determined by reference o standard texts, such as *Thyristor Phase Controlled Converters and Cycloconverters*, by B. R. Pelly, published by Wiley-Interscience.

Application of the polyphase alternating current excitation to the turbine generator stator winding 32 establishes a rotating magnetic field which interacts with the static magnetic field established by the synchronous generator field winding 26. The output of the cycloconverter 80 is increased gradually and continuously until the turbine has accelerated to the speed at which the tubine power exceeds the starting resistance torque, whereupon the input current to the synchronous generator stator winding 32 is removed. The excitation provided by the supplemental AC power source to the quadrature axis AC winding is also removed once the desired operating speed has been achieved.

Across the line starting, according to conventional techniques, is not suitable for the present application because high speed cylindrical type rotors are not designed to absorb the energy dissipated when a large inertia load such as the gas turbine prime mover is accelerated from zero speed. The stator voltage cannot be decreased substantially because the resulting starting torque would be insufficient to drive the load of the gas turbine before it is powered. Further, the stator winding cannot safely absorb the forces connected with starting under full line voltage and normal amplitude and frequency due to the large amount of energy expended. However, by applying a voltage proportional to frequency and at an initially lower frequency, and by slowly increasing the amplitudes and frequency of the applied stator excitation in the manner described above, the turbine generator may be started synchronously without risk of damage to the stator winding or rotor components.

Figure 4:
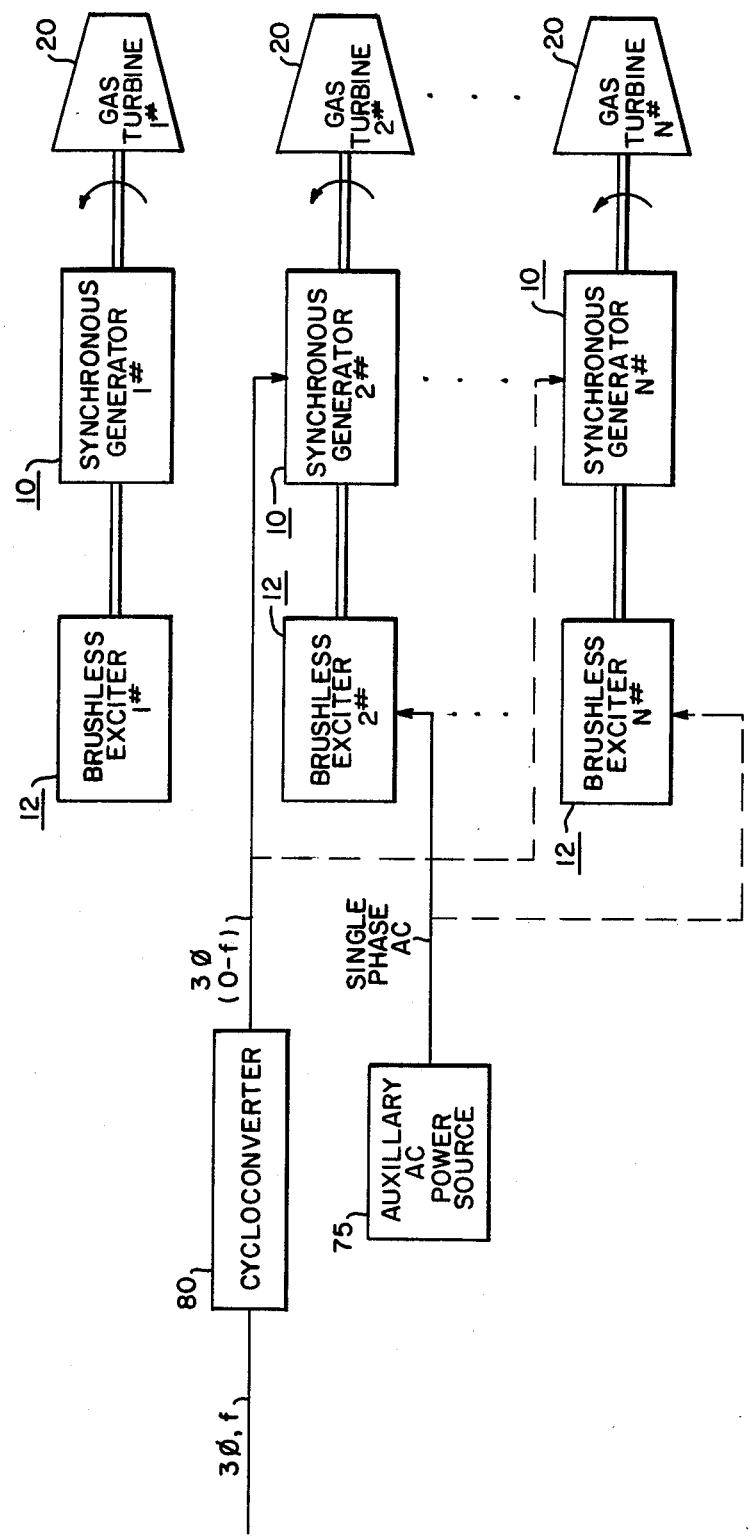

In FIG. 4, it is apparent that the starting method of the present invention may be used to good advantage in a power generating station having a plurality of gas turbine generating units. A single cycloconverter 80 and a single auxiliary AC power source 75 may be used to start a plurality N of the gas turbine prime mover 20 in turn, each of the associated synchronous generators 10 having a brushless exciter 12 which has been modified with the quadrature axis AC starting winding 62. This combination eliminates the need for an individual starter for each gas turbine, which greatly reduces the capital expenditure which would otherwise accrue.

We claim:

1. In combination,
   a synchronous dynamoelectric machine having a stator member carrying a polyphase alternating current stator winding and a rotor member carrying a direct current rotor field winding; and,
   a main exciter for said synchronous dynamoelectric machine having a rotatable armature winding and rectifier connected to conduct direct current to said rotor field winding, a stator core comprising a plurality of salient poles, a plurality of field coils disposed on selected ones of said salient poles, said field coils being connected together to constitute a direct current stator field winding, and at least one starting coil interposed between salient poles, the magnetic axis of said starting coil being disposed substantially in space-quadrature relation with respect to the magnetic axes of adjacent field coils, said starting coil being disposed to induce alternating current in said armature winding when said starting coil is energized by a single phase alternating current source.

2. The combination as defined in claim 1 including:
   means for providing variable frequency polyphase alternating current excitation to said polyphase alternating current armature winding during startup of said dynamoelectric machine.

3. The combination as defined in claim 2 wherein said means for providing variable frequency polyphase alternating current excitation is a cycloconverter having a polyphase input circuit connected to receive polyphase alternating current from a supplemental polyphase power source and a polyphase output circuit connected to conduct polyphase alternating current excitation to said stator winding, said cycloconverter being operable to convert said input polyphase alternating current of a first amplitude and a first frequency to output polyphase alternating current excitation having an output frequency which is variable through a predetermined frequency range and an output magnitude which is variable through a predetermined magnitude range.

4. The combination as defined in claim 1 including a large inertia load, said load having a rotatable shaft portion mechanically coupled in driving relation to said rotor member for rotation therewith.

5. The combination defined by claim 4 in which said large inertia load is a gas turbine prime mover.

6. A dynamoelectric machine comprising, in combination:
   a shaft;
   a rotatable armature member disposed on said shaft, said armature member carrying an armature winding;
   a stator member having a plurality of salient poles thereon concentrically disposed about and spaced apart from said armature;
   a stator field coil disposed on selected ones of said salient poles, said stator field coils being connected together to constitute a stator field winding; and,
   a plurality of alternating current induction coils interposed between adjacent ones of said salient poles, the magnetic axes of said induction coils being disposed substantially in space quadrature relation with respect to the magnetic axes of said field coils, said induction coils being connected together to constitute a single phase an alternating current starting winding.

7. In a synchronous dynamoelectric machine, a rotor member having field coils connected together to form a rotor field winding, an alternating current exciter having a stator member and a plurality of salient stator poles thereon, stator field coils disposed on said salient poles and connected together to form a stator exciter field winding and at least one starting coil interposed between salient poles, the magnetic axis of said starting coil being disposed substantially in space-quadrature relation with respect to the magnetic axes of adjacent field coils, an exciter armature member rotatable with said rotor field winding and having an armature winding thereon, said exciter armature winding being coupled magnetically with said exciter stator field winding for developing an alternating current excitation signal within said armature winding, rectifier means interconnecting said armature winding and said rotor field winding to provide direct current excitation to said rotor field winding;
   the combination with said synchronous dynamoelectric machine of means connected to a supplemental source of single phase alternating current to induce by magnet induction an alternating current excitation signal within said exciter armature winding when said rotor is at standstill, whereby direct current excitation is provided to said rotor field winding by said rectifier means independently of rotor rotation to permit acceleration of said rotor from rest to a predetermined operating speed by the interaction of the static magnetic field established by the rotor field winding with the rotating magnetic field established by the dynamoelectric machine stator winding in response to polyphase alternating current excitation applied thereto, the frequency of said polyphase excitation being variable in frequency from substantially zero cycles per second to a higher frequency which corresponds with the rotation of said rotor at a speed substantially equal to said predetermined operating speed.

8. A method of accelerating the rotor member of a synchronous dynamoelectric machine from rest to a predetermined speed of rotation, said dynamoelectric machine having a brushless exciter with a quadrature axis winding around the stator of said exciter, said dynamoelectric machine having a polyphase alternating current stator winding and a direct current rotor field winding, said method comprising:
   exciting the rotor field winding of said rotor member with direct current to establish a static magnetic field by connecting said rotor field winding to receive direct current excitation from the rotatable rectifier assembly of a brushless exciter, said brushless exciter including an alternator having a direct-axis, direct current stator winding and an alternating current quadrature-axis winding, the step of exciting the field winding of said synchronous dynamoelectric machine being accomplished by:
   exciting said quadrature axis winding of the stator of said exciter with single phase alternating current, whereby alternating current is induced within the rotor armature winding of said exciter and direct current excitation is applied to said rotor field winding through said rotatable rectifier independently of the rotation of said rotor member;
   exciting the stator winding of said dynamolelectric machine with polyphase alternating current to establish a dynamic magnetic field which rotates at a speed proportional to the frequency of the applied polyphase alternating current excitation; and,
   increasing the frequency of the applied polyphase alternating current excitation from substantially zero cycles per second to a higher frequency until said rotor member has accelerated to said predetermined speed of rotation.

9. The method as defined in claim 8 wherein said rotor member is mechanically coupled in driving relation to the rotor member of a prime mover, the step of increasing the frequency of the applied polyphase alternating current excitation being continued until the rotor member of said prime mover and said rotor of said synchronous dynamoelectric machine have accelerated to a speed at which the starting resistance torque of said dynamolelectric machine is less than the power output torque of said prime mover.

10. The method as defined in claim 8 including the step of increasing the magnitude of the applied polyphase alternating current excitation in proportion to the frequency of said applied excitation.

* * * * *